No. 11,681. Reissued July 19, 1898.

J. F. OHMER & H. TYLER.

FARE REGISTER.

(Application filed May 7, 1898.)

5 Sheets—Sheet 1.

Witnesses:
W. F. Voss.
John W. Kallfus

J. F. Ohmer.
Hiram Tyler.
Inventors:
By R. J. McCarty.
Attorney.

No. 11,681.

Reissued July 19, 1898.

J. F. OHMER & H. TYLER.

FARE REGISTER.

(Application filed May 7, 1898.)

5 Sheets—Sheet 2.

J. F. Ohmer.
Hiram Tyler.
Inventors:
By R. J. McCarty
Attorney.

Witnesses:
W. F. Voss
John W. Rathfon

No. 11,681. Reissued July 19, 1898.

J. F. OHMER & H. TYLER.

FARE REGISTER.

(Application filed May 7, 1898.)

5 Sheets—Sheet 3.

Witnesses:

W. F. Voss.

John W. Kalfus

J. F. Ohmer,

Hiram Tyler,

Inventors:

By R. J. McCarty

Attorney.

No. 11,681.
Reissued July 19, 1898.
J. F. OHMER & H. TYLER.
FARE REGISTER.
(Application filed May 7, 1898.)
5 Sheets—Sheet 4.
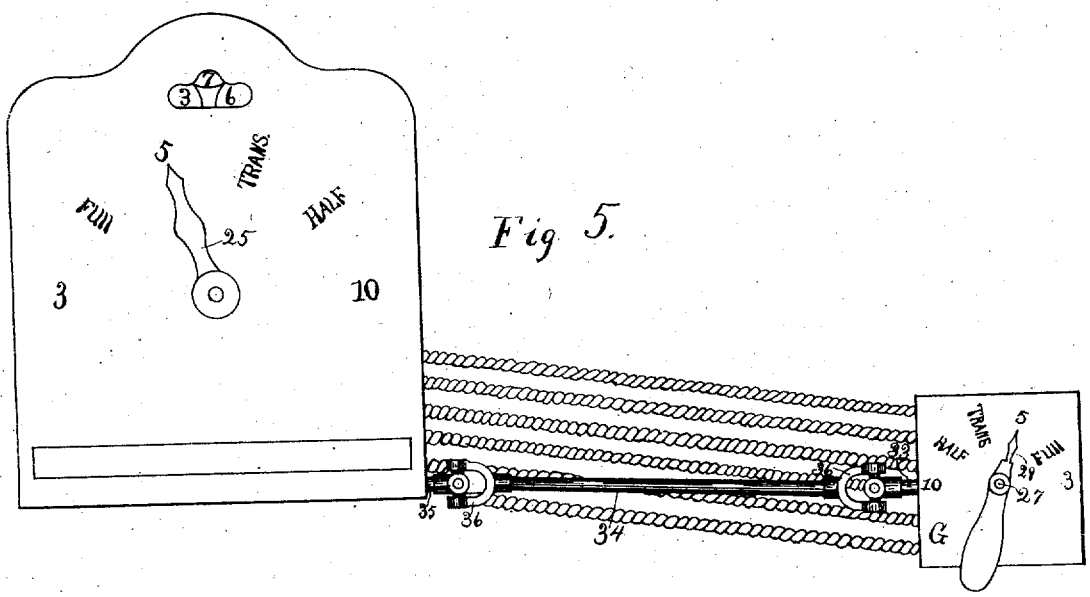
Fig. 5.
Fig. 6
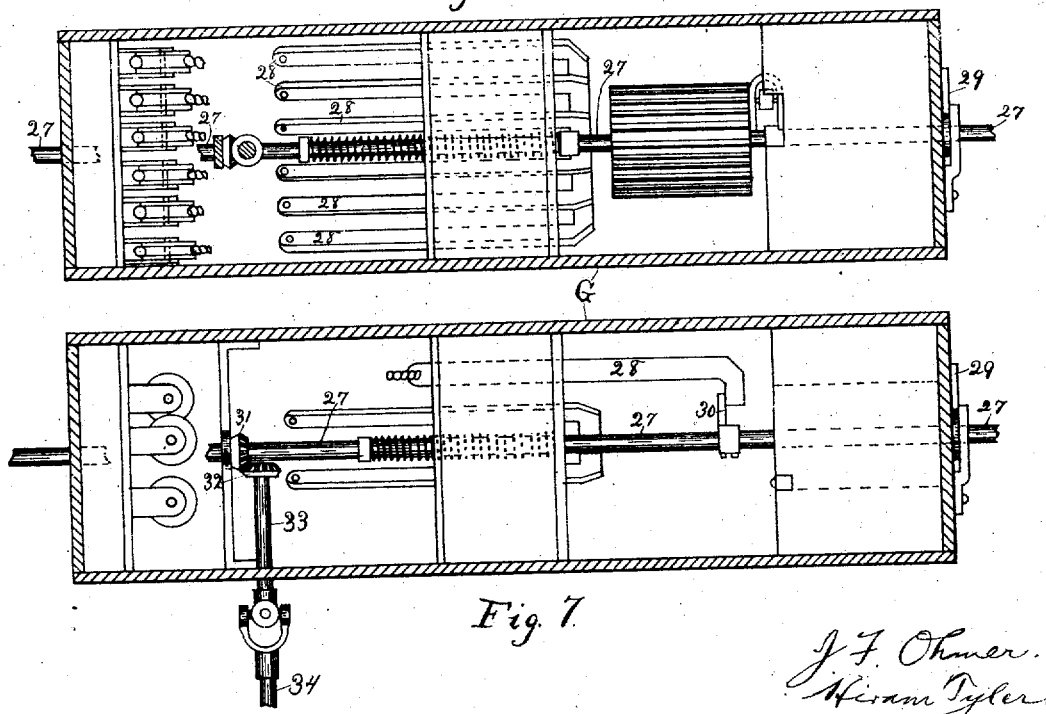
Fig. 7
Witnesses.
W. F. Voss.
John W. Halfpenny
J. F. Ohmer.
Hiram Tyler.
Inventors:
By R. J. McCarty.
Attorney.

No. 11,681. Reissued July 19, 1898.

J. F. OHMER & H. TYLER.

FARE REGISTER.

(Application filed May 7, 1898.)

5 Sheets—Sheet 5.

John F. Ohmer, Jr.
Hiram Tyler.
INVENTORS.

WITNESSES

Earl H. Moe.
Charles B. Nevin.

By R. J. McCarty
their ATTORNEY.

UNITED STATES PATENT OFFICE.

JOHN F. OHMER AND HIRAM TYLER, OF DAYTON, OHIO; SAID TYLER ASSIGNOR TO SAID OHMER.

FARE-REGISTER.

SPECIFICATION forming part of Reissued Letters Patent No. 11,681, dated July 19, 1898.

Original No. 597,561, dated January 18, 1898. Application for reissue filed May 7, 1898. Serial No. 680,066.

*To all whom it may concern:*

Be it known that we, JOHN F. OHMER and HIRAM TYLER, citizens of the United States, residing at Dayton, in the county of Montgomery and State of Ohio, have invented certain new and useful Improvements in Fare-Registers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in fare-registers for use in street-cars and other public conveyances, and has specific reference to means for operating the registering and indicating mechanisms of the type of fare-registers shown and described in Letters Patent No. 582,366, granted jointly to ourselves May 11, 1897, in which a classified registration of the different fares is kept. Separate indications of each specific fare and of the number of passengers taken on in each trip are given.

The object of the invention is to provide means for operating the registering and indicating mechanisms of a register of the above type regardless of the number of classifications of fares and the different characters of fares to be indicated.

To this end the invention has reference to parts and their arrangements, as will hereinafter appear.

Figure 1:
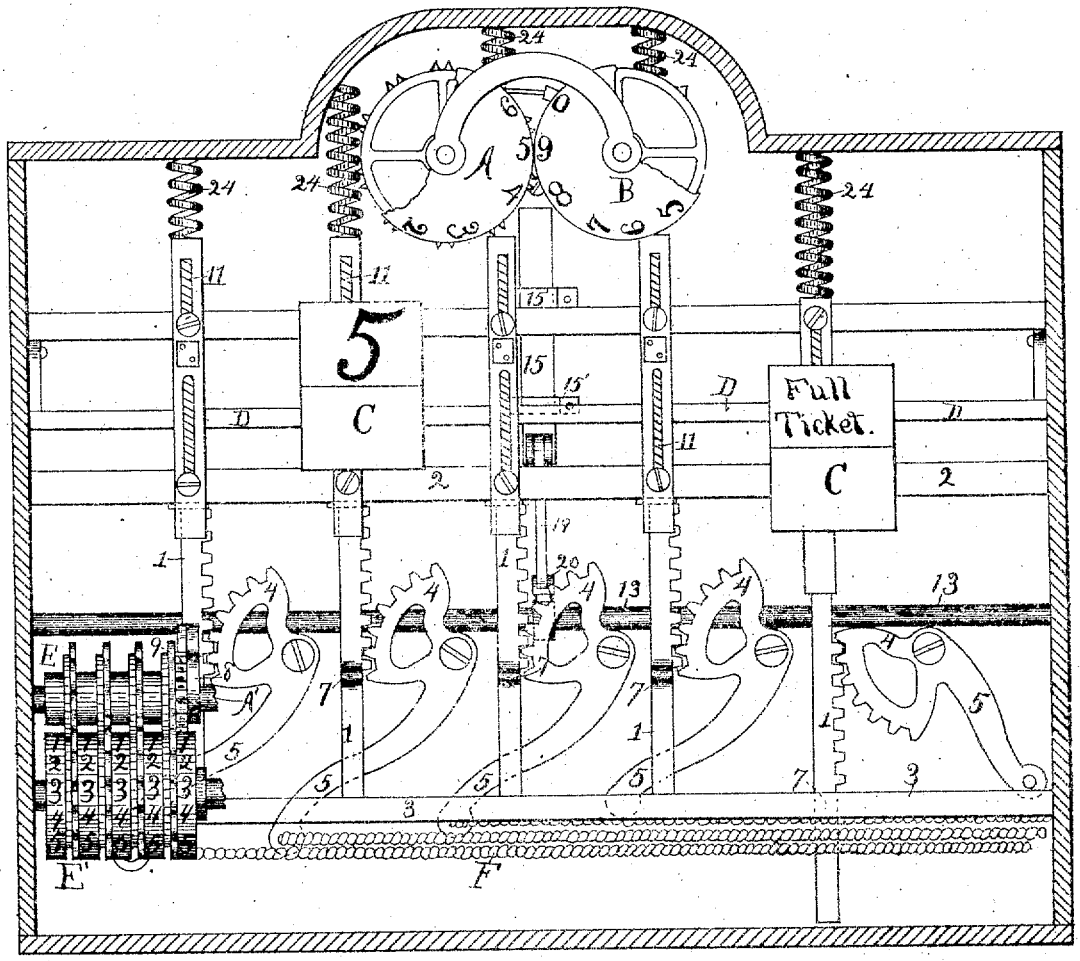
Figure 2:
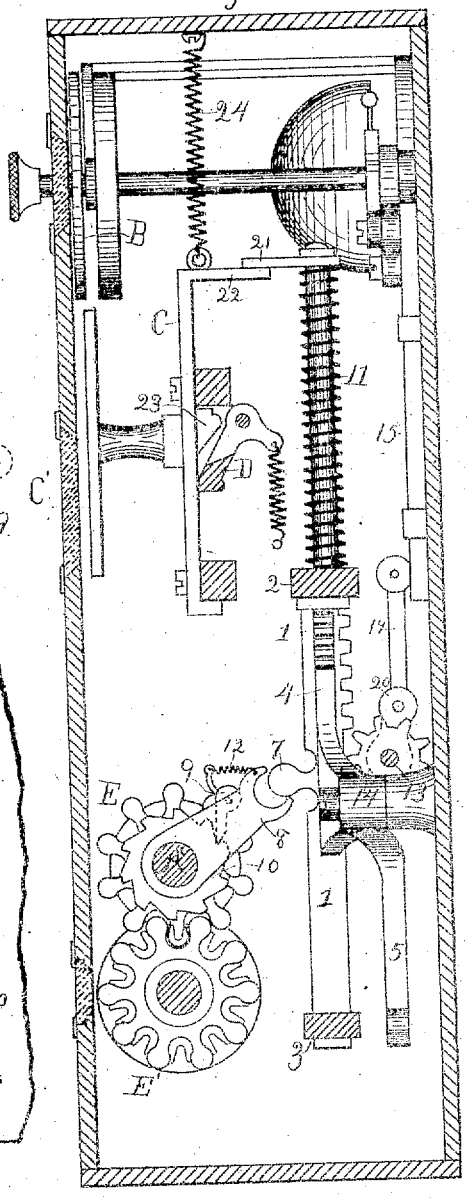
Figure 4:
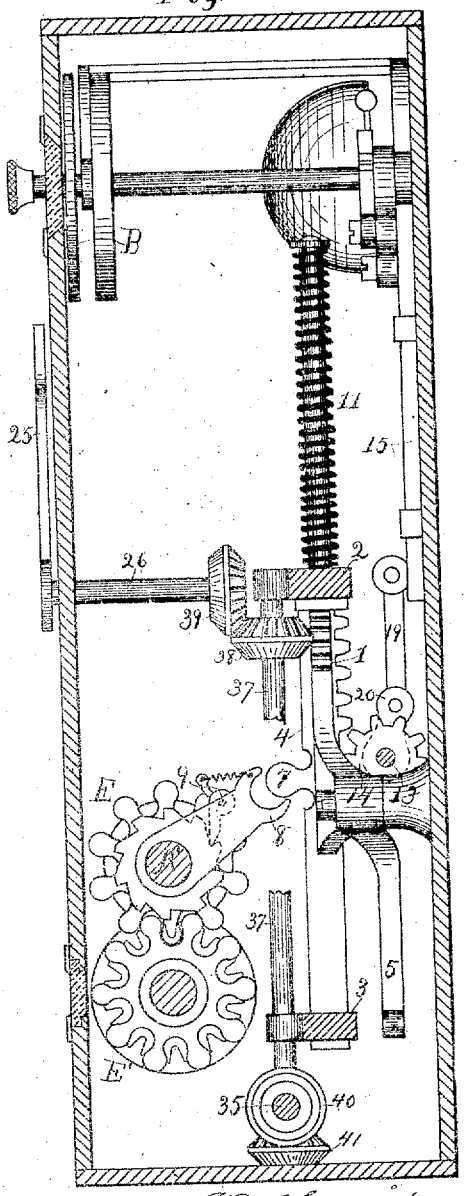
Figure 9:
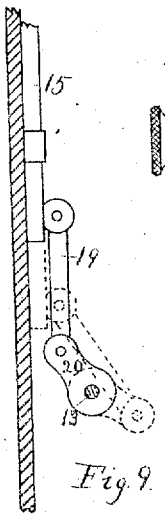
Figure 8:
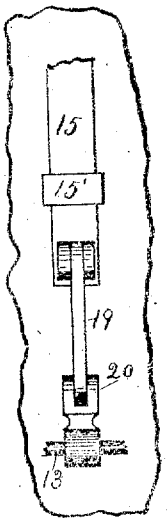
Figure 3:
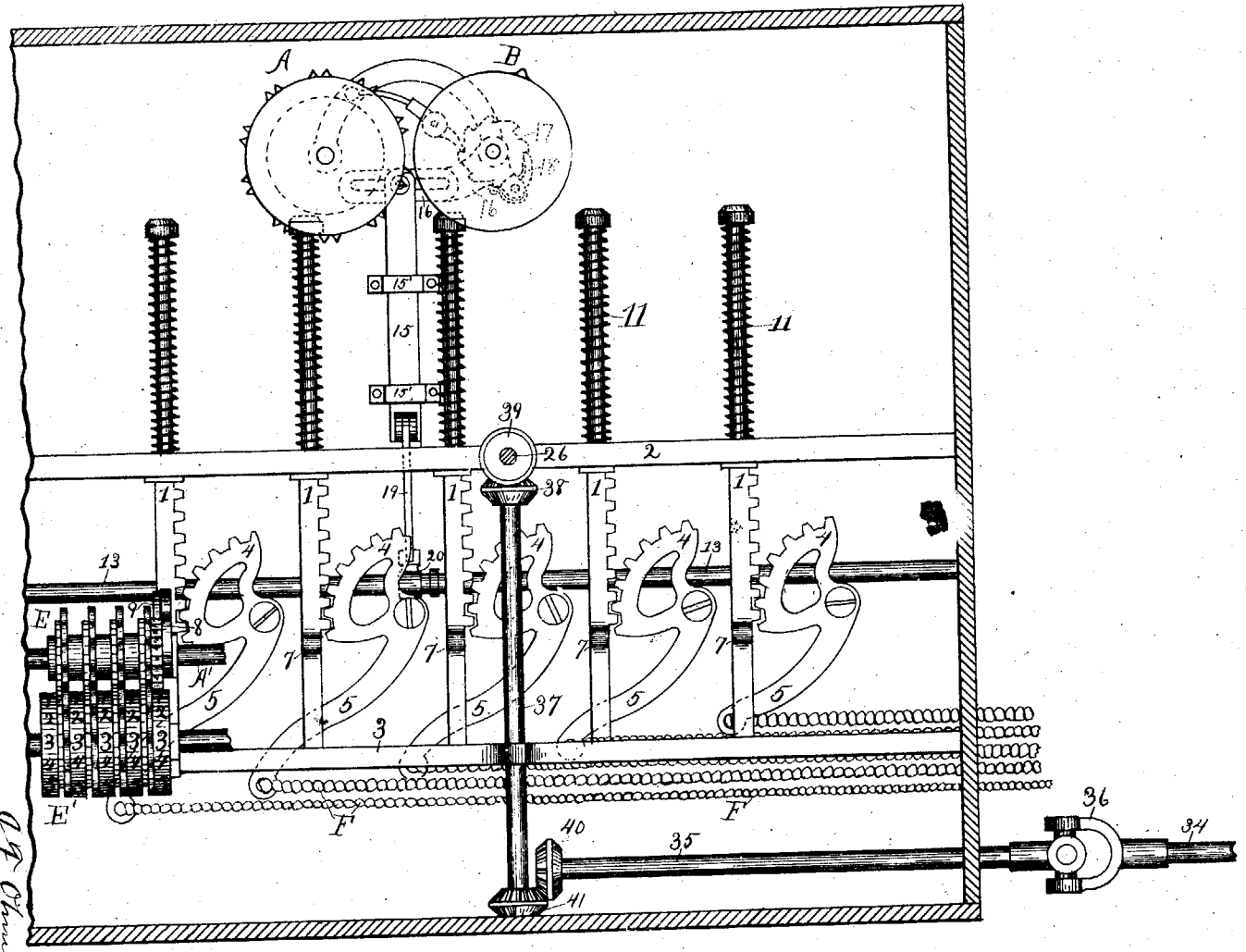
Figure 10:
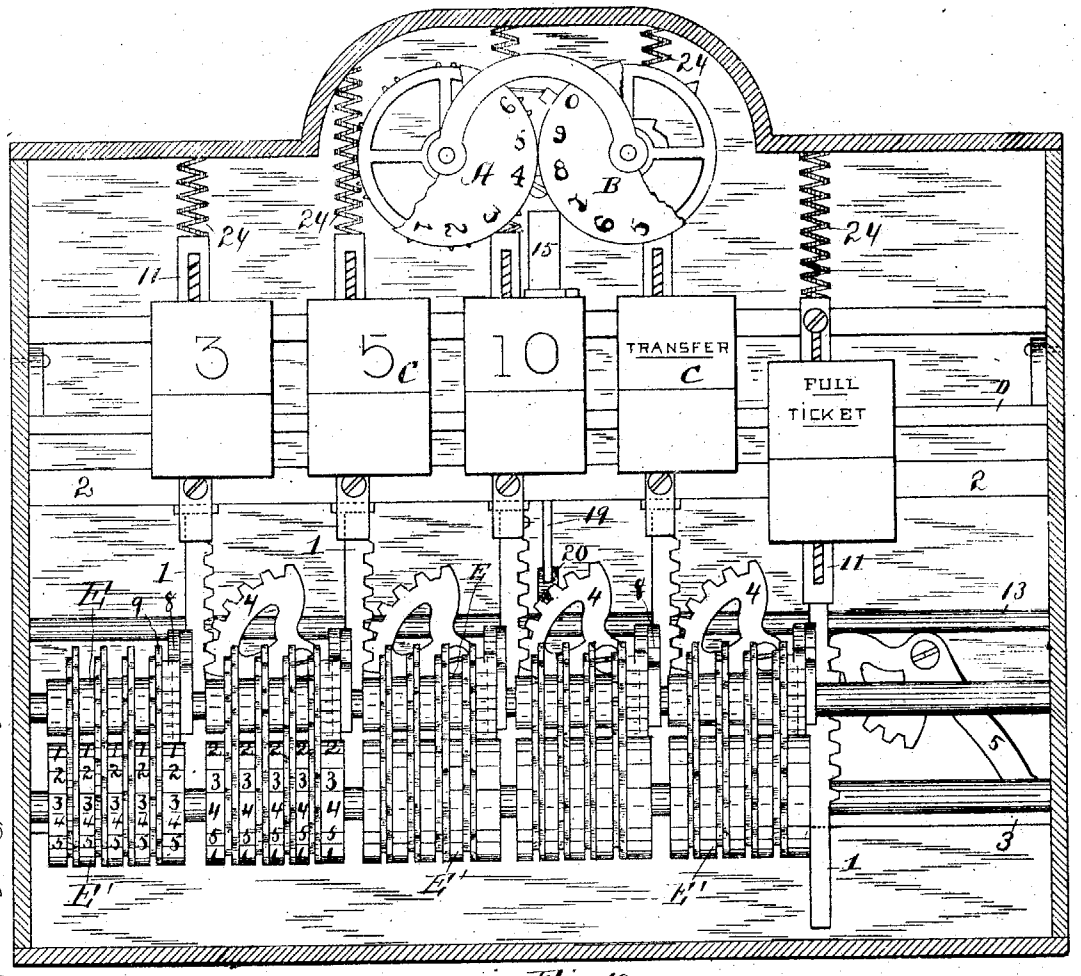

Referring to the accompanying drawings, Figure 1 is a front elevation of a fare-register constructed in accordance with our invention. Fig. 2 is a sectional side elevation. Fig. 3 is a front elevation differing in some particulars from that shown in Fig. 1. Fig. 4 is a sectional side elevation of Fig. 3. Fig. 5 is a front elevation of a fare-register with dial-indicating mechanism connected therewith. Fig. 6 is a longitudinal section through the casing in which the rope or cable actuating mechanism is inclosed. The mechanism is seen in side elevation. Fig. 7 is a similar sectional view in which the said mechanism is shown in a plan view. Figs. 8 and 9 are front and side elevations of the slide and connections through which the trip-register wheels are operated. Fig. 10 is a front elevation of a fare-register, showing five series of register-wheels and a corresponding number of fare-indicators.

Throughout the specification similar reference characters indicate corresponding parts.

The trip-indicator wheels A and B, the fare-indicators C, and the oscillating retaining and releasing bar D, Figs. 1 and 2, and the registering-wheels E and E′ are substantially the same as shown and described in the patent before referred to, and the present invention appertains to the means for imparting the various movements thereto, which will now be described.

1 designates a series of vertically-movable compound racks that are inclosed in guides 2 and 3, extending across the interior of the casing.

4 designates a corresponding number of toothed sectors fulcrumed in positions to mesh with the teeth on one side of the racks and provided with extensions 5, to which the operating ropes or cables F are attached.

7 designates a lug, of which there is one projecting from each of the racks.

8 is a reciprocating lever on the shaft A′ of wheels E. 9 is a click-pawl pivoted to a side of said lever and engaging with the ratchet-wheel 10, that is keyed to the adjacent wheel. It will be understood that these fare-registering wheels E and E′ are arranged in sets, each of which has its own respective classification of fares. Each downward movement of the racks 1 depresses a lever 8 to advance the wheels of its respective set in a well-known manner upon the upward movement of each of said racks by reason of the expansion of coil-springs 11, of which there is one on the upper rounded end of each of said racks, inclosed between the finger 21 and the horizontal guide 2. The levers 8 will also return to their normal positions under the influence of a resetting-spring 12.

13 designates a transverse shaft journaled in suitable bearings.

14 is a spur-pinion, of which there is one meshing with each of the racks 1. These pinions are fixed to the shaft 13 and mesh with the teeth on one side of the rack. An oscillatory movement is imparted to the shaft by the movement of any one of the racks, and this movement is likewise transmitted to the trip-indicator wheels A and B through the following mechanism:

15 designates a vertically-movable slide inclosed in guides 15′, attached to the rear of the casing or in any suitable manner. The slotted lever 16, which actuates the ratchets 17 and 18, is loosely connected to the upper end of said slide. (See Fig. 3.) 19 is a link loosely connected with the lower end of said slide and similarly connected to an oscillating piece 20, that is moved with the shaft 13, being fixed to a central part thereof. A movement of the said shaft through the gearing described will likewise move the slide and connections, as indicated by the dotted lines, Fig. 9.

Each of the fare-indicators C has a specific fare inscribed thereon and is lowered in line with one of the sight-openings C′ to indicate said fare through arms 21, that project from the upper ends of the racks 1. Similar projections 22 are on the upper ends of the indicators, with which the arms 21 engage to lower said indicators. The spring-controlled retaining and releasing bar D extends across the case in the rear of the indicators, and when each of said indicators is lowered the said bar enters above a lug 23 on the rear thereof and holds the indicator in position to expose the fare until the next succeeding operation of the gearing. When released, each indicator is raised through the action of a resetting-spring 24.

In Figs. 3, 4, and 5 different means for indicating fares are shown, consisting of a dial on the front of the register bearing indications denoting the several kinds of fares. These are pointed to by a hand 25, which is fixed to an arbor 26. This arbor is rotated to bring the hand to the proper position by a train of gearing set in motion manually through the movement of a rod 27, which is mounted in the street-car in which our system is operated. This rod and a series of engaging slides 28, through which the ropes or cables F are operated to transmit movement to the interior mechanism of the register, are shown in Figs. 6 and 7, and are also shown and described in Letters Patent No. 582,365, granted to one of the present applicants, May 11, 1897. It is therefore not necessary to describe said mechanism only in so far as it relates to the system of fare indications now being described. The rod 27 has both a rotary and longitudinal movement, the former to bring a series of hands 29, located at different points throughout the car, to indicate the fares simultaneously at all of said points and to bring a finger 30 to a position to engage with the slides 28 to move the latter and therewith the operating ropes or cables F.

31 is a miter-gear mounted within the casing G on the rod 27 to rotate therewith, but to remain stationary when said rod is moved longitudinally. 32 is a similar gear meshing with the gear 31 and imparting movement to a shaft 33, that projects through a side of the case G and is mounted in proper bearings therein. This casing G is mounted in suitable proximity to the register.

34 is a horizontal shaft lying between the casing and the fare-register, as shown in Fig. 5, and connected to shafts 33 and 35 by universal joints 36. The shaft 35 is projected into the register-casing and is geared to an upright shaft 37 by miter-wheels 40 and 41. The arbor 26, to which the index-hand 25 is fixed, is geared to this upright shaft 37 through miter-gears 38 and 39. The movements imparted to the several shafts when the rod 27 is rotated are indicated by the several arrows. Each indicator, as made by the pointer on the dial of the register, will correspond to the indications made upon the casing G, as shown in Fig. 5, and at such other points on the car where dials may be placed.

Having fully described our invention, we claim—

1. In a fare-register, the combination with trip-indicator wheels; of a reciprocating slide; an oscillating shaft extending across the machine; a pivotal connection between said shaft and the slide, and a plurality of racks geared to said oscillating shaft, each one of said racks being adapted to impart similar movement to said oscillating shaft, substantially as described.

2. In a fare-register, the combination with trip-indicator wheels; a slide, and mechanism actuated thereby to advance said indicator-wheels; of an oscillating shaft; a pivotal connection between said oscillating shaft and the slide; a series of racks geared to said oscillating shaft; and a series of toothed sectors geared to said racks, substantially as described.

3. In a fare-register, the combination with trip-indicator wheels; a slide, and mechanism between said slide and trip-indicator wheels for imparting movement to the latter; of an oscillating shaft; a pivotal connection between said shaft and the slide; a series of racks geared to said shaft, and a series of oscillating gears geared to said racks.

4. In a fare-register, the combination with a series of fare-indicators denoting the various fares; and a series of trip-indicator wheels denoting the number of passengers; of a series of compound racks; a series of oscillating gears to impart movement to said racks, and mechanism actuated by the movement of each of said racks to move the fare and trip indicators, substantially as described.

5. In a fare-register, the combination with a series of sliding fare-indicators, and a series of rotating trip-indicators; of a reciprocating slide; mechanism actuated by said slide to move the trip-indicators; an oscillating shaft pivotally connected to said slide; a series of racks geared to said oscillating shaft; projections on said racks to engage with the fare-indicators to lower them, and an oscillating gear geared to each of said racks, whereby each of said racks may be moved independently of the others to simultaneously impart movement to the trip-indicators, and to a specific-fare indicator.

6. In a fare-register, trip-indicator wheels, in combination with a transverse oscillating shaft; a reciprocating slide pivotally connected to said shaft; mechanism actuated by said slide to turn the indicator-wheels; a series of compound gears geared to said oscillating shaft; a toothed sector geared to each of said racks, and a series of sliding fare-indicators one of which is simultaneously moved with each movement of the indicator-wheels.

7. In a fare-register, fare-register wheels arranged in series, each of said series denoting a specific class of fares; a series of sliding fare-indicators, each one of which denotes a specific kind of fare; and a series of trip-indicator wheels denoting the number of passengers taken on in each trip; of a series of compound racks each one of which operates in connection with a specific class of fares, and a specific fare-indicator, and all of said racks having a corresponding action on the trip-indicator wheels; oscillating gears geared to said racks, and mechanisms actuated by the movement of any one of said racks to actuate said fare-register wheels; fare-indicators, and the trip-indicator wheels, substantially as described.

8. In a fare-register, the combination of trip-indicator wheels; sliding fare-indicators denoting the various fares; fare-register wheels arranged in series each series having its own classification of fares; and a series of independently-movable parts each of which is adapted to actuate a specific-fare indicator and set of fare-register wheels, and to simultaneously and correspondingly move the trip-indicator wheels, substantially as described.

9. The combination with a fare-register having an indicating-dial, and a finger to point to the indication thereon; an auxiliary dial placed at various points and having indications thereon corresponding with the indications on the dial of the fare-register; of an operating-rod movable both axially and longitudinally; pointers on said rod adapted to be moved to simultaneously indicate a corresponding fare on the auxiliary dial, and connections between the dial on the fare-register and the operating-rod, whereby a similar fare is simultaneously indicated on the said fare-register dial, substantially as described.

10. In a fare-register, the combination of trip-indicator wheels; three or more series of register-wheels, each series registering a single class of fares; three or more fare-indicators denoting the various fares; and mechanisms for actuating a specific-fare indicator and a specific series of fare-register wheels, and to simultaneously and correspondingly move the trip-indicator wheels, substantially as described.

JOHN F. OHMER.
HIRAM TYLER.

Witnesses:
R. J. McCarty,
W. F. Voss.